United States Patent
Raftis et al.

(10) Patent No.: US 6,585,005 B1
(45) Date of Patent: Jul. 1, 2003

(54) REINFORCED TIDE GATE VALVE

(75) Inventors: Spiros G. Raftis, Pittsburgh, PA (US); Michael J. Duer, Pittsburgh, PA (US)

(73) Assignee: Red Valve Co., Inc., Carnegie, PA (US)

( * ) Notice: Subject to any disclaimer, the term of this patent is extended or adjusted under 35 U.S.C. 154(b) by 0 days.

(21) Appl. No.: 09/641,474

(22) Filed: Aug. 18, 2000

Related U.S. Application Data

(60) Provisional application No. 60/149,601, filed on Aug. 18, 1999.

(51) Int. Cl.$^7$ .............................................. F16K 15/14
(52) U.S. Cl. ........................................ 137/850; 137/846
(58) Field of Search ................................ 137/846, 847, 137/848, 849, 850, 853

(56) References Cited

U.S. PATENT DOCUMENTS

| | | | |
|---|---|---|---|
| 187,411 A | * 2/1877 | Painter | 137/850 |
| 3,342,208 A | * 9/1967 | Steffes | 137/853 |
| 4,566,493 A | 1/1986 | Edwards et al. | |
| 4,585,031 A | 4/1986 | Raftis et al. | 137/846 |
| 4,607,663 A | 8/1986 | Raftis et al. | 137/846 |
| 4,993,452 A | * 2/1991 | Hough | 137/850 X |
| 5,027,823 A | * 7/1991 | Sanaka | 137/850 X |
| 5,176,173 A | 1/1993 | McGarrah | |
| 5,330,437 A | * 7/1994 | Durman | 137/846 X |
| 5,606,995 A | 3/1997 | Raftis | 137/846 |
| 5,727,593 A | * 3/1998 | Duer | 137/846 |
| 5,769,125 A | 6/1998 | Duer et al. | 137/844 |
| 5,881,772 A | * 3/1999 | Bennett | 137/846 |
| 5,924,452 A | * 7/1999 | Szpara et al. | 137/846 |
| 5,931,197 A | * 8/1999 | Raftis et al. | 137/847 |
| 6,044,859 A | * 4/2000 | Davis | 137/850 X |
| 6,092,551 A | * 7/2000 | Bennett | 137/846 |
| 6,136,253 A | * 10/2000 | Bennett | 137/846 X |

FOREIGN PATENT DOCUMENTS

WO    WO 98/395589    9/1998

* cited by examiner

Primary Examiner—John Rivell
(74) Attorney, Agent, or Firm—Webb Ziesenheim Lodgsdon Orkin & Hanson, P.C.

(57) ABSTRACT

A support mechanism for a tide gate valve having an internal cavity, wherein the support mechanism includes a support body receivable in the tide gate valve cavity to help prevent the tide gate valve from collapsing in on itself when subjected to backflow pressure. The support mechanism is positioned adjacent to a pipe end and can take the shape of a ring having legs or flanges, a cage, a partial or more than partial cone, or other suitable shape. Moreover, arms can extend from the ring to provide further support and orifices can be added to the support mechanism to increase or decrease flow characteristics.

7 Claims, 9 Drawing Sheets

REINFORCED TIDE GATE VALVE

CROSS-REFERENCE TO RELATED APPLICATION

This application claims the benefit of earlier filed United States Provisional Patent Application Serial No. 60/149,601, filed Aug. 18, 1999, entitled "Reinforced Tide Gate Valve".

BACKGROUND OF THE INVENTION

1. Field of the Invention

The present invention relates to tide gate valves, and, in particular, to inversion resistant support devices for tide gate valves.

2. Description of the Prior Art

A tide gate valve is essentially a valve which allows fluid to flow in only one direction through a conduit, while closing and preventing back or reverse flow, when back pressure builds up downstream of the valve to a level greater than the upstream fluid pressure head.

As shown in FIGS. 1–4, the basic structure of a tide gate valve 10 includes an inlet end 14, called a cuff, an outlet end 16, called a bill, and a transition part 18, called a saddle. The inlet end 14 is normally a tubular structure that is securely attachable to the end of a pipe in a drainage system. Attached to the inlet end 14 is the transition part 18, which, when connected to the inlet end 14, tapers outward on its vertical axis and inward on its horizontal access. The resulting shape of the transition part is likened to a duck-bill and is constructed from a flexible, pliable material, such as rubber. At the end of the transition part 18 is a slit-shaped outlet end 16, which allows the flow of a liquid material through the outlet end 16. Projecting outward from the end of the outlet end 16 are two vertical lips 21 which define a vertical slit 20.

In normal operation, when fluid is flowing through a piping system outlet 12 into the tide gate valve 10, the fluid enters through the inlet end 12 and proceeds to the transition part 18. Fluid then enters the outlet end 16 and exits through the vertical slit 20 formed by the two vertical lips 21. The pliability of the transition part 18 allows the fluid to easily flow through the vertical slit 20, and, if any back pressure or back flow is encountered, the shape of the transition part 18 clamps the two vertical lips 21 together, disallowing back flow. However, as the transition part is made of a pliant material, too much back pressure will cause the transition part 18 to buckle in upon itself, separating the two vertical lips 21 and widening the vertical slit 20. This, in turn will allow fluid to enter through the outlet end 16 and back again through the tide gate valve 10 into the inlet end 14 and piping system outlet 12.

In order to overcome this possible tide gate valve failure, fabric reinforcing plies may be used to increase the strength and stiffness of the valves. As demonstrated in U.S. Pat. No. 4,585,031 to Raftis et al., a multiple-ply sleeve, in combination with a rigid support member provides inversion resistance in a tide gate valve application. U.S. Pat. No. 4,607,663 to Raftis et al. teaches the usage of staggered embedded pads to provide sufficient strength for inversion and sagging resistance in a tide gate valve application. Using lengthened lips connected to a sleeve area has been proposed to increase inversion resistance, as demonstrated in U.S. Pat. No. 5,606,995 to Raftis. Finally, U.S. Pat. No. 5,769,125 discloses a check valve, which includes a hinge and trough construction, which is also an inversion deterrent.

While the prior art uses some form of reinforcement against possible inversion, the designs in the previously-mentioned patents are still believed to be deficient in withstanding immediate or sudden high pressure back flow. Further, the prior art can only provide increased inversion protection at the cost of increased pressure drop in the forward direction of flow. In essence, the trade off of inversion resistance as against head loss requires great improvement.

It is therefore an object of this invention to overcome the design problems associated with prior art rubber tide gate valves. It is another object of this invention to maximize valve resistance to back pressure without sacrificing pressure drop in the required flow direction.

SUMMARY OF THE INVENTION

The present invention relates to a backflow prevention system generally including a tide gate valve, such as a duck-billed type of valve, and a support structure. The tide gate valve generally includes an inlet end, a transition part or saddle connected to the inlet end, an outlet end positioned adjacent to the saddle, and an inner surface which defines an internal cavity that fluidly connects the inlet end and the outlet end. The support structure generally includes a bearing surface positioned adjacent the inner surface of the tide gate valve in the area of the transition part and at least one opening for fluid flow through the support structure. The support structure is receivable in the internal cavity of the tide gate valve and preferably extends through the inlet end and into the saddle, with the bearing surface at least in part engageable by the inner surface of the tide gate valve.

The support body can be a pipe end, a cylindrical ring having an upstream end and a downstream end engageable on a pipe end, a cage, or other suitable device. A flange may be positioned on the upstream first end of the cylindrical ring, with the flange engageable with a mating flange on a pipe end. At least one support arm may extend from the downstream end of the cylindrical ring, such as two inwardly directed support arms. A plate may be positioned on the cage.

The exterior shape of the support body may be generally in the shape of a cone, a truncated cone, a shortened or dulled hollow conical shape, a cylindrical shape, a cage-like shape, a conical shape, or other suitable shape.

The invention itself, both as to its construction and its method of operation, together with additional objects and advantages thereof, will best be understood from the following description of specific embodiments when read in connection with the accompanying drawings.

DETAILED DESCRIPTION OF THE PREFERRED EMBODIMENTS

Figure 2:
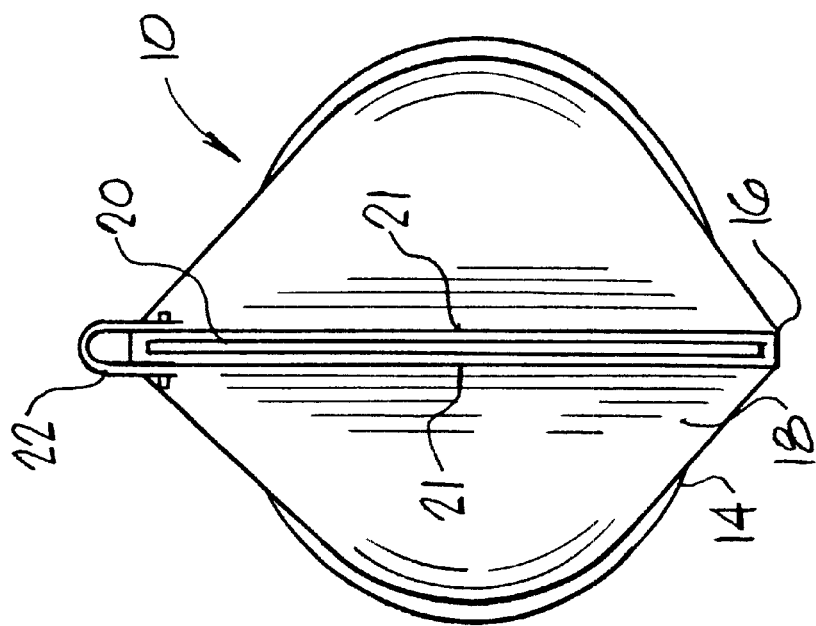
FIG. 2 is a front end view of the prior art rubber duck-bill tide gate valve of FIG. 1.
Figure 1:
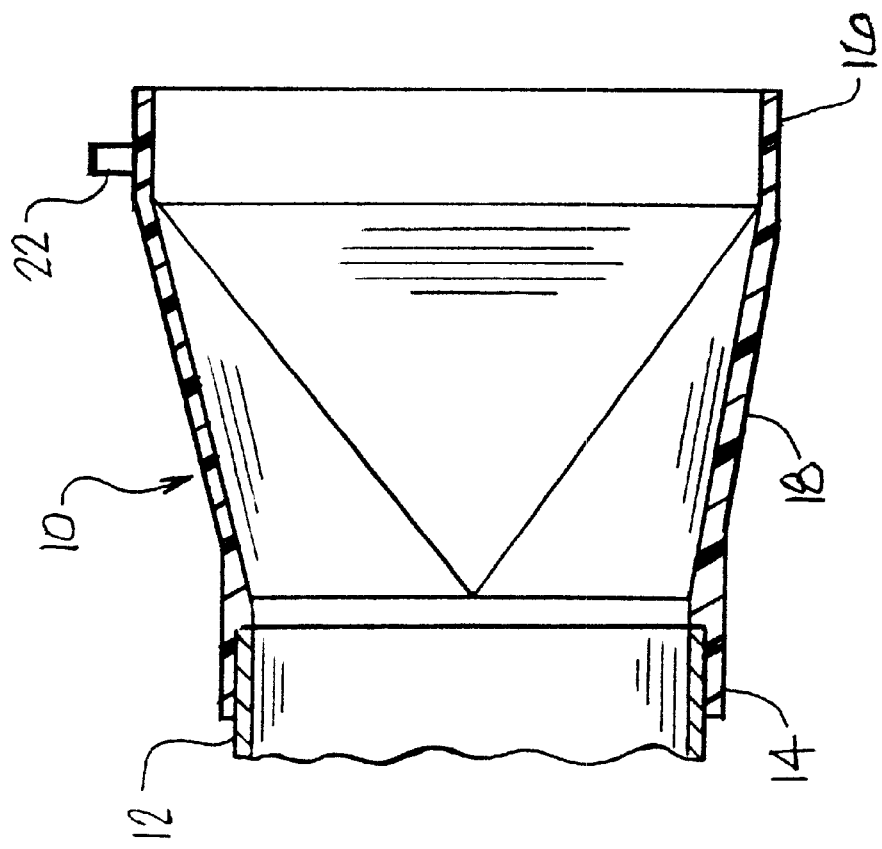
FIG. 1 is a side sectional view of a prior art rubber duck-bill tide gate valve.
Figure 4:
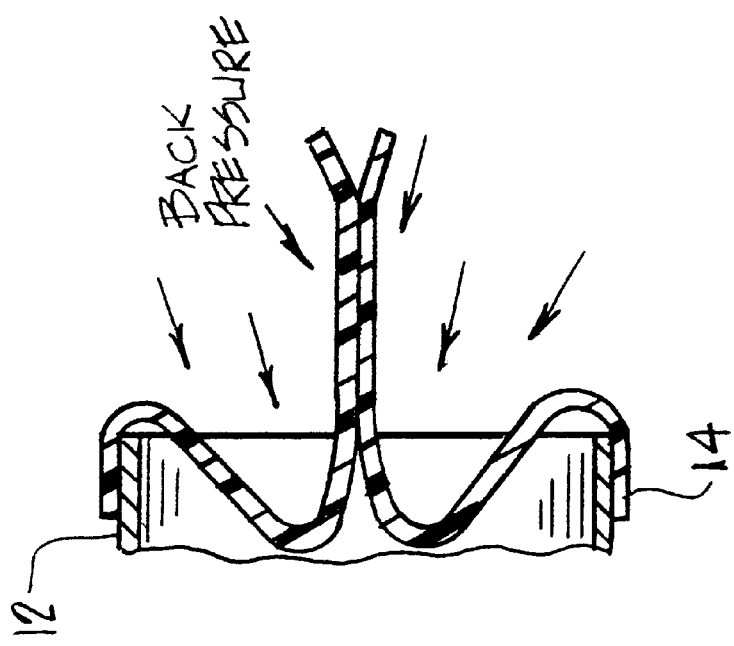
FIG. 4 is a top sectional view of a collapsing and inverting prior art duck-bill tide gate valve.
Figure 3:
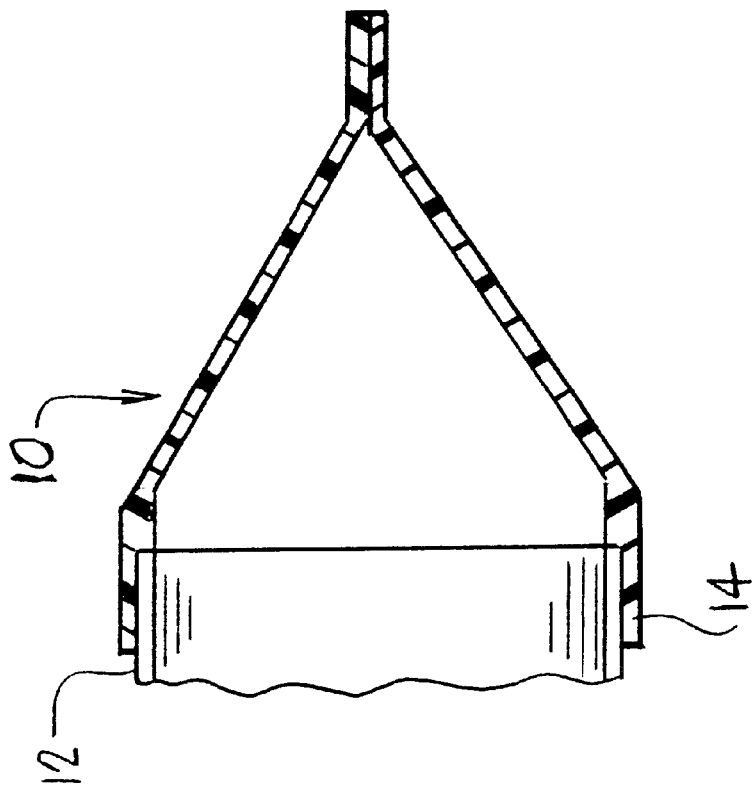
FIG. 3 is a top sectional view of the prior art rubber duck-bill tide gate valve of FIG. 1.
Figure 5A:
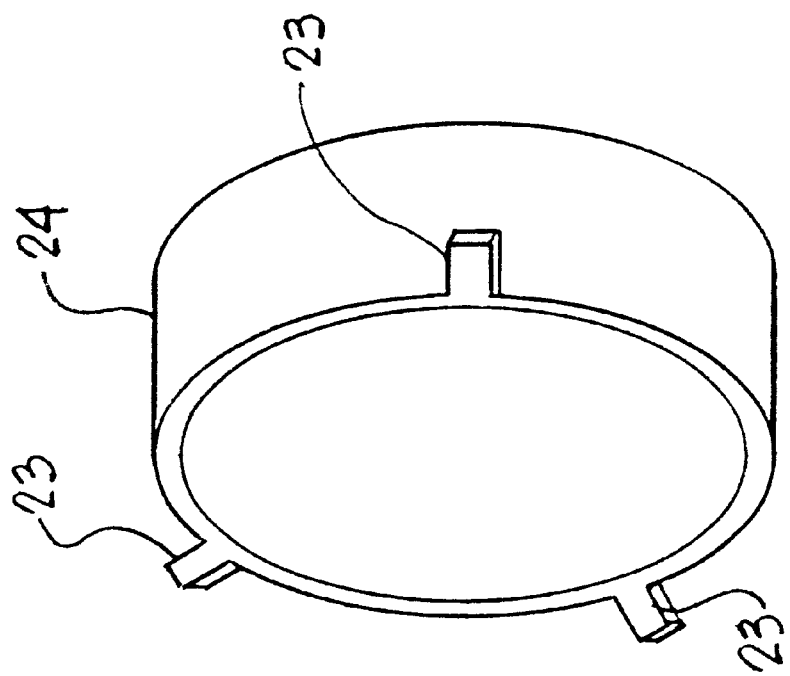
FIG. 5a is a perspective view of a support ring according to the first embodiment of the present invention.
Figure 5:
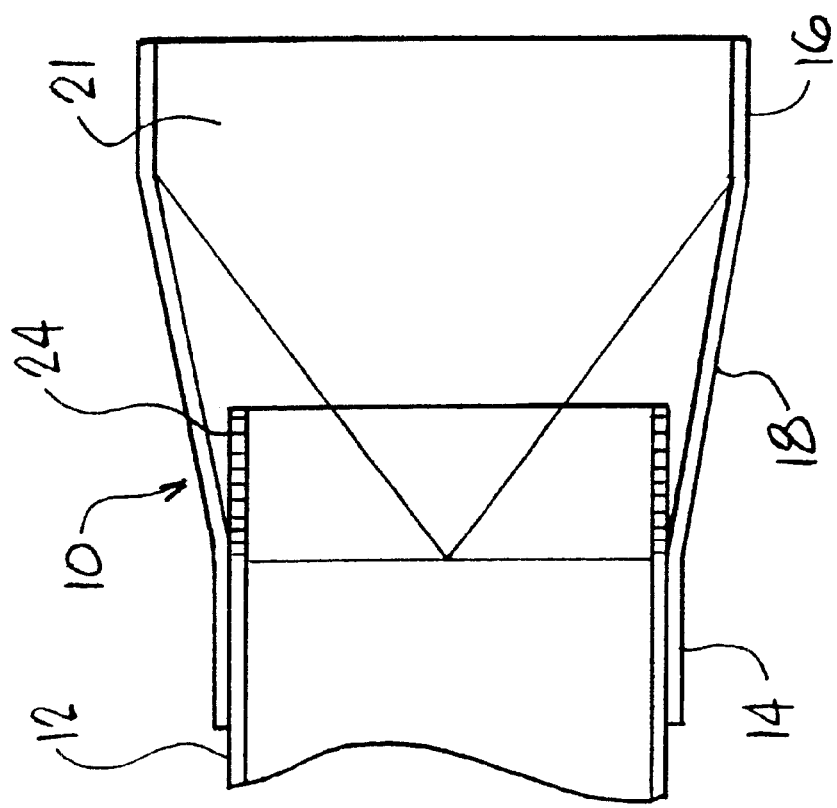
FIG. 5 is a side sectional view of a first embodiment of the present invention.
Figure 6:
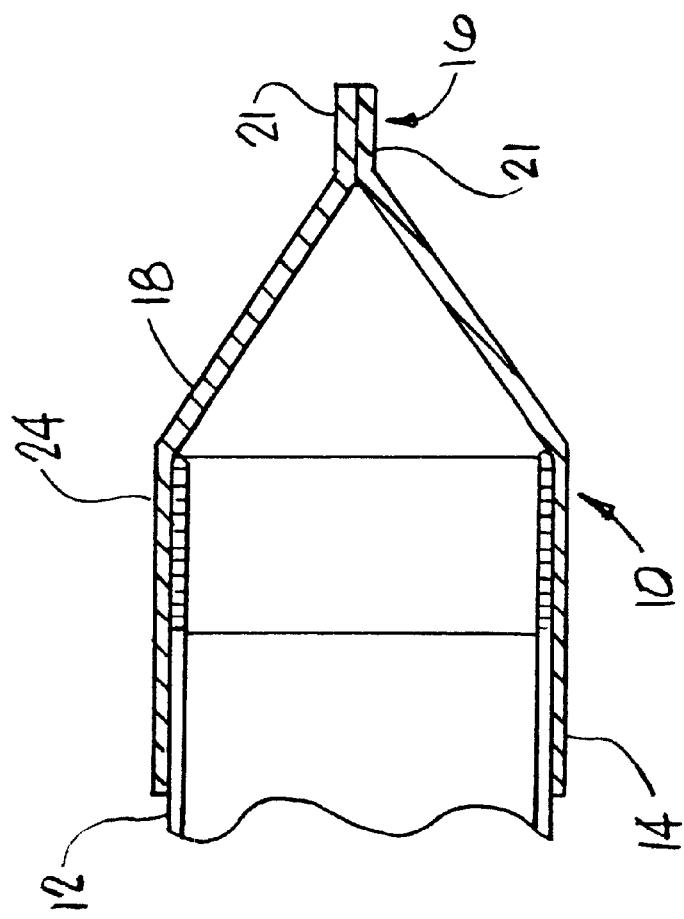
FIG. 6 is a top sectional view of the embodiment of the invention shown in FIG. 5.
Figure 7:
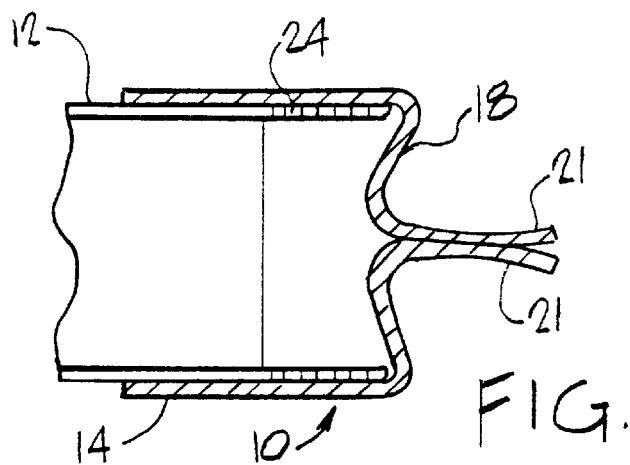
FIG. 7 is a top sectional view of the first embodiment of the present invention during a period of high back pressure.

The first embodiment of the present invention is generally shown in FIGS. 5–16. As shown in FIG. 5 in order to support the transition part 18, a support ring 24 is attached to the piping system outlet 12. As illustrated in FIGS. 5 and 6, the support ring 24 extends outward from the piping system outlet 12, through the inlet end 14 of the tide gate valve 10 and into the interior space of the transition part 18. When the support ring 24 is properly attached to the piping system outlet 12 or the piping system outlet is properly extended, the transition part 18 will rest against the support ring 24 in high back pressure situations. In resting against the support ring 24, illustrated in FIG. 7, the transition part 18 will not collapse in upon itself.

Figure 5B:
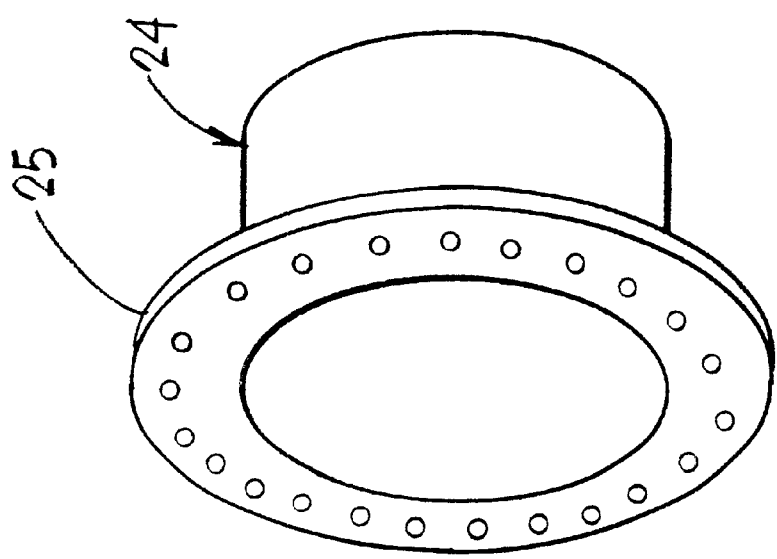
FIG. 5b is a perspective view of an alternative support ring according to the first embodiment of the present invention with an alternative means for connection.

The support ring 24 is typically constructed of a rigid material, such as steel. As seen in FIG. 5a and FIG. 5b, the support ring 24 can also consist of a separate piece that is attachable to the piping system outlet 12 via lock joint or bolted flange or other means of connection. For example, legs 23 shown in FIG. 5a can be received in a corresponding fitting (not shown) positioned adjacent the system outlet 12 and the fitting or the support ring 24 can be twisted, turned, or otherwise oriented to secure the support ring 24 to the system outlet 12. FIG. 5b shows a flange 25, which may form a plurality of orifices, wherein the flange is attached to the system outlet 12 directly or via a second type of fitting (not shown) corresponding to the flange 25 using fasteners (not shown).

Figure 8:
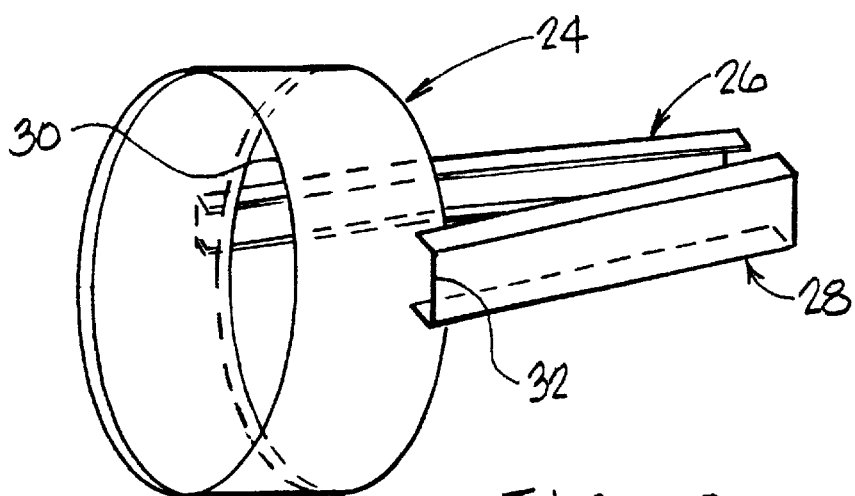
FIG. 8 is a perspective view of a support structure according to a second embodiment of the present invention.
Figure 9:
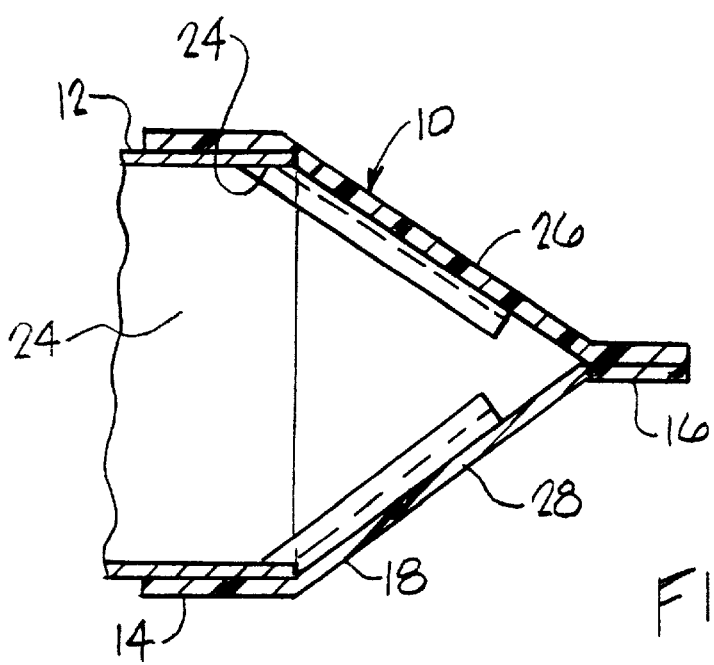
FIG. 9 is a top sectional view of the structure of FIG. 8 inserted in a tide gate valve according to the second embodiment of the present invention.

The second embodiment of the invention is used in higher back pressure situations and adds support channels 26 and 28 to the support ring 24. This embodiment is shown in FIG. 8. These support channels 26 and 28 are connected at one end to the support ring 24 and extend angularly inward, matching the contour of the transition part 18. As seen in FIG. 9, the support channels 26 and 28 provide even greater support to the pliable transition part 18. When significant back pressure is encountered, the transition part 18 rests firmly against the support channels 26 and 28, disallowing any inversion of the transition part 18 without increasing the stiffness of the transition part 18.

Figure 10:
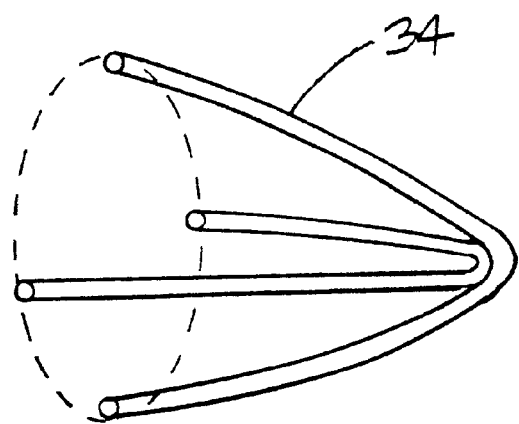
FIG. 10 is a perspective view of a support structure according to a third embodiment of the present invention for slurry applications.

The third embodiment of the present invention is for use in high back pressure situations and is shown in FIG. 10. A support cage 34 can be directly attached to the piping system outlet 12 or via a support ring 24. The support cage 34 is typically made of circular cross section steel rod or bar, but can be made from any suitable material or configuration. In operation, the support cage 34 provides the transition part 18 with ample support against inversion. Additionally, the support cage 34 is manufactured to rest along the inside wall of the transition part 18, matching the contour of the duck-bill shape of the transition part 18.

Figure 11:
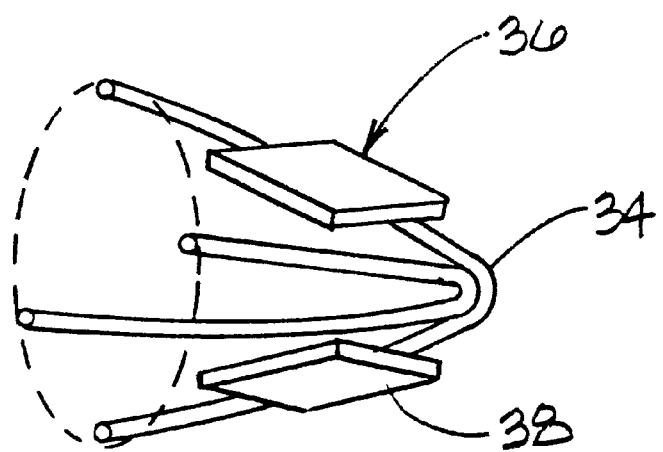
FIG. 11 is a perspective view of the support structure of FIG. 10 modified.

When periods of high back pressure are encountered the transition part 18 rests against and is supported by the support cage 34. This support cage 34 is especially applicable in large particle, or slurry, applications. In applications where very low pressure drop is required and the particle size of the fluid is small, support plates 36 and 38 can be attached to the sides of the support cage 34. As seen in FIG. 11, the support plates 36 and 38 provide higher surface area for the transition part 18 to rest against. Further, the connections between support cage 34 and support plates 36 and 38 for example, by welding, effectively distribute the stresses in the transition part 18 during periods of back pressure and back flow.

Figure 12:
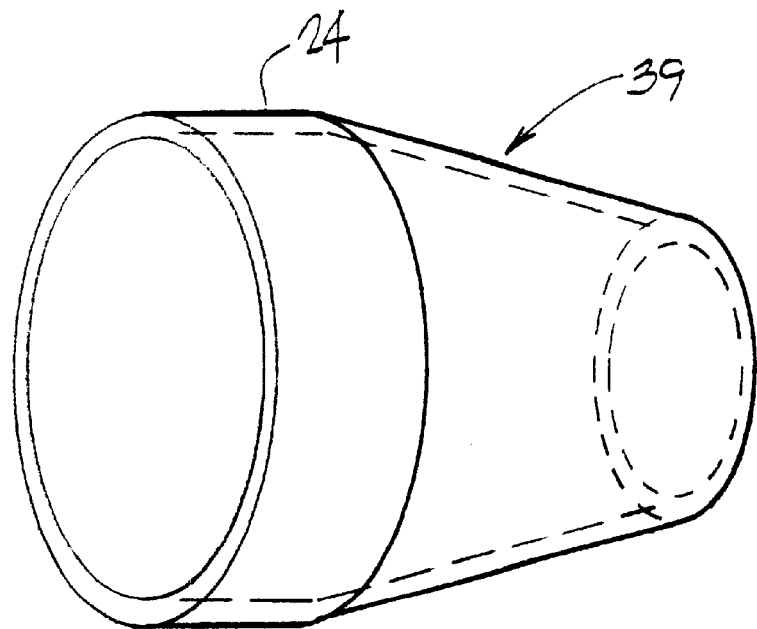
FIG. 12 is a perspective view of a support structure according to a fourth embodiment of the present invention.
Figure 13:
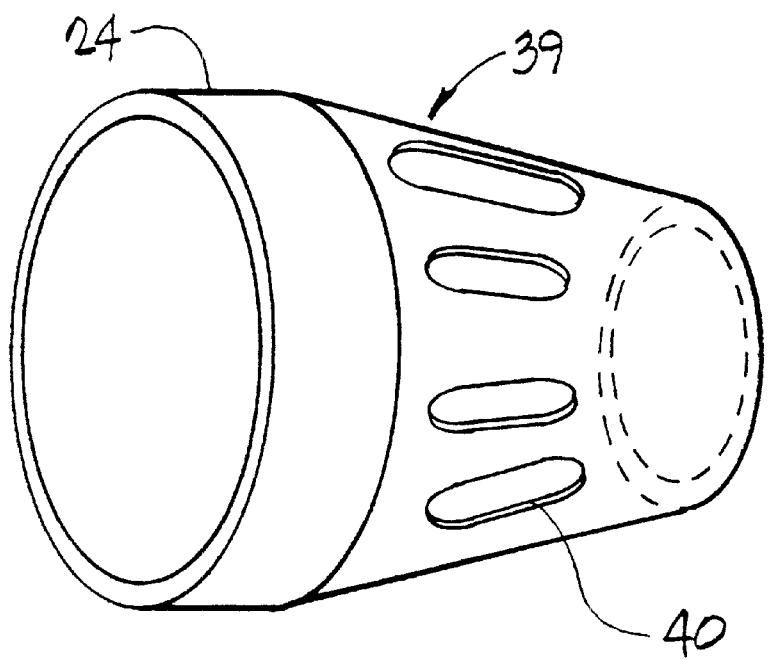
FIG. 13 is a perspective view of the support structure of FIG. 12 with additional port openings.

In a fourth embodiment of the present invention, the greatest protection against inversion is through the usage of a truncated cone support 39, as seen in FIG. 12. This truncated cone support may be attached to a support ring 24 or attached directly to the end of the piping system outlet 12. The basic structure of the truncated cone support 39 is a hollow cone with the tip of the cone removed; the shape matching the contour of the transition part 18. In operation, the fluid path is directed through the tapered end of the truncated cone support 39. However, in periods of back pressure and back flow, the transition part 18 rests at all points against the outside walls of the truncated cone support 39. This provides increased surface area, thereby increasing the support in back pressure situations. In order to provide additional flow paths and reduce head loss through the truncated cone support 39, ports 40 may be added to the sides of the truncated cone support 39. These ports 40 are shaped to allow increased fluid flow through and around the truncated cone support 39. This increase flow, in turn, will reduce the head loss at the tide gate valve 10.

Figure 14:
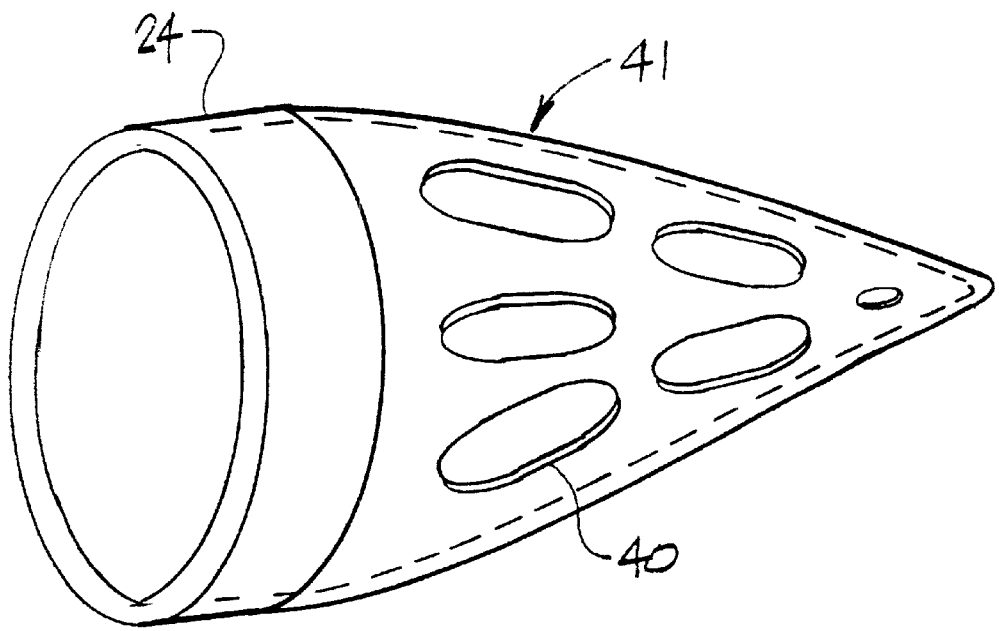
FIG. 14 is a perspective view of a support structure according to a fifth embodiment of the present invention.
Figure 15:
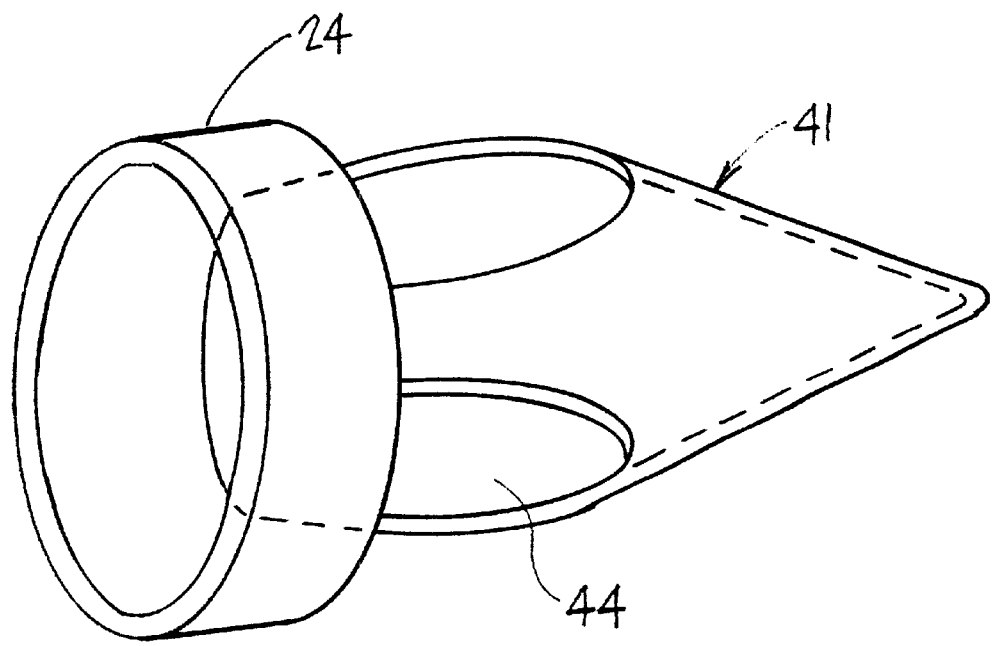
FIG. 15 is a perspective view of the support structure of FIG. 14 with larger port openings at the base of the support cone.
Figure 16:
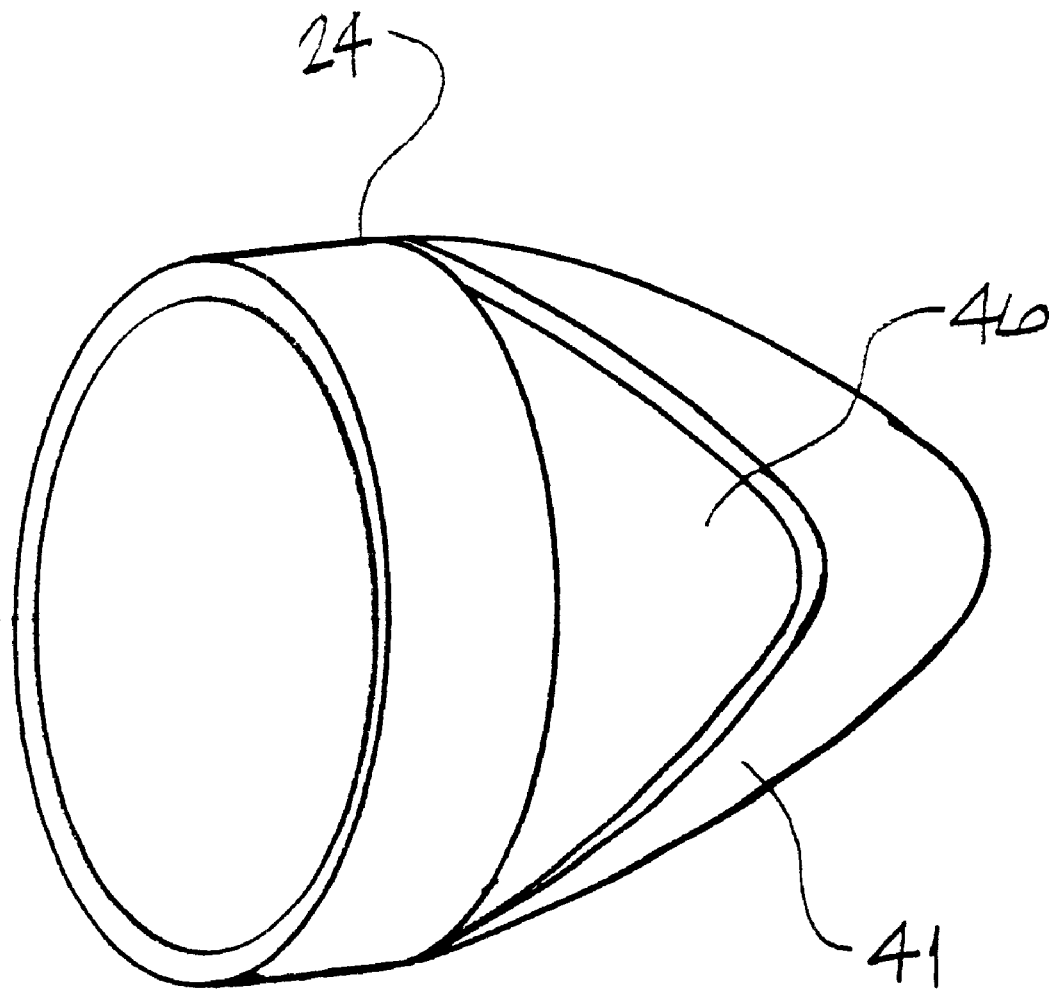
FIG. 16 is a perspective view of the support structure of FIG. 14 with angular port openings at the base of the support cone.

The fifth embodiment of the present invention is illustrated in FIG. 14 through FIG. 16 and is utilized for the maximum protection against inversion. In this embodiment, a full cone support 41 (i.e., not truncated) is used as the support mechanism for the transition part 18. Again, this full cone support 41 may be attached either to a support ring 24 or directly to the piping system outlet 12. Unlike the truncated cone support 39, the full cone support requires multiple ports 40 in order to allow fluid flow. These ports 40 provide the necessary paths for flow as the full cone support 41 is a true hollow conical structure with a solid tip, as seen in FIG. 14.

In periods of back pressure and back flow, the full cone support 41 provides the maximum amount of surface area and support for the pliable transition part 18. Turning to FIG. 15, as opposed to the smaller ports 40, the full cone support 41 may also be constructed with large side ports 44 at the base of the full cone support 41. These large side ports 44 allow for fluid flow at the base, with maximum inversion protection near the outlet end 16 of the tide gate valve 10.

The full cone support 41 may also be shaped as a shortened or dulled hollow conical shape. In FIG. 16, this version of the full cone support 41 has large triangular ports 46 on each side of the full cone support 41. These large triangular ports 46 provide paths for the flow, while the blunted end of the full cone support 41 provides protection against possible inversion during periods of back flow.

Overall, the present invention creates an efficient durable tide gate valve 10 with increased inversion resistance characteristics. Using any of the foregoing embodiments of the present invention will protect the transition part 18 from inverting during periods of back flow and back pressure. Additionally, the structure of the present invention does not significantly increase head loss or increase pressure drop through the tide gate valve 10 during outflow. Also, the present invention is suitable as a newly manufactured tide gate valve 10 or, alternatively, suitable for retrofitting onto older tide gate check valves via connection to the piping system outlet 12 or to an attached support ring 24.

In all of the aforementioned embodiments, the support structure 24, 26, 28, 34, 36, 39, 41 is separate from the transition part or saddle 18 of the tide gate valve. Thus, during outflow, the transition part 18 may open and at least in part disengage from the support structure to allow fluid flow between the support structure and the interior surface of the transition part. Separate construction also allows for changing of the rubber tide gate valve 10 in older installations, without the necessity of replacing the support structure.

Various modifications to the construction of the supporting members are anticipated by this disclosure. For example, the support channels 26 and 28 may be fastened to the support ring 24 using intermediate leaf springs, providing flexibility at the fastening point, allowing the support channels 26 and 28 to spread apart as flow increases. Further, the support members can be constructed of other cross sections, such as I-beam, hollow square, hollow circular, solid rectangle, solid square, solid round, and other suitable shapes. Also, the number of support members and openings can be modified to increase or decrease support versus flow. Construction materials that provide sufficient rigidity to the support members, other than steel, may also be anticipated. Finally, the tide gate valves 10 and support structures of the present invention may be mounted on the end of a pipe (as shown) or mounted in-line (i.e., in a housing installed in a piping system) as is well known in the art.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

We claim:

1. A support structure for a tide gate valve, said tide gate valve having an inlet end, an outlet end and an inner surface which defines an internal cavity that connects said inlet end and said outlet end, said support structure comprising:

a support body having a bearing surface; and at least one opening for passage of fluid through the support body, wherein said support body is receivable in the cavity of said tide gate valve, said support body is a cylindrical ring engagable on a pipe end, said ring has an upstream end and a downstream end, and a support arm extends from said downstream end of said cylindrical ring.

2. The support structure for a tide gate valve as claimed in claim 1 further comprising a flange positioned on the upstream end of said cylindrical ring, said flange engageable with a mating flange on a pipe end.

3. The support structure as claimed in claim 1, wherein said tide gate valve is a duck-billed type of valve.

4. A support structure for a tide gate valve, said tide gate valve having an inlet end, an outlet end, and an inner surface which defines a cavity that connects said inlet end and said outlet end, said support structure comprising:

a support body having a bearing surface; and at least one opening for passage of fluid through the support body, wherein said support body is receivable in the cavity of said tide gate valve, said support body is a cage, and a plate is positioned on the cage.

5. The support structure as claimed in claim 4, wherein said tide gate valve is a duck-billed type of valve.

6. A support structure for a tide gate valve, said tide gate valve having an inlet end, and an inner surface which defines an internal cavity that connects said inlet end and said outlet end, said support structure comprising:

a support body having a bearing surface; and at least one opening for passage of fluid through the support body, wherein said support body is receivable in the cavity of said tide gate valve, said support body is a cylindrical ring engagable on a pipe end, said ring has an upstream end and a downstream end, and two inwardly directed support arms extend from said downstream end of said cylindrical ring.

7. The support structure as claimed in claim 6, wherein said tide gate valve is a duck-billed type of valve.

* * * * *